United States Patent [19]

Schober

[11] 3,954,907

[45] May 4, 1976

[54] COMPOSITION WITH SELECTED VINYL COMPOUNDS AND PROCESS FOR AVOIDING SCORCHING OF ETHYLENE POLYMER COMPOSITION

[75] Inventor: Donald L. Schober, Belle Mead, N.J.

[73] Assignee: Union Carbide Corporation, New York, N.Y.

[22] Filed: Nov. 27, 1974

[21] Appl. No.: 527,855

[52] U.S. Cl.................................. 260/875; 526/13; 526/32; 526/227; 526/328; 526/347; 526/350
[51] Int. Cl.².......................... C08F 8/00; C08F 8/06; C08F 255/02
[58] Field of Search.................... 260/94.9 GA, 875; 450/623.5

[56] References Cited
UNITED STATES PATENTS

| | | | |
|---|---|---|---|
| 3,240,662 | 3/1966 | Smyers et al. | 260/94.9 GA UX |
| 3,436,371 | 4/1969 | Wave | 260/94.9 GA X |
| 3,531,455 | 9/1970 | Straub | 260/94.9 GA |
| 3,661,877 | 5/1972 | Bluestein et al. | 260/86.7 |

*Primary Examiner*—William F. Hamrock
*Attorney, Agent, or Firm*—James J. O'Connell

[57] ABSTRACT

Vulcanizable ethylene polymer based compositions which are susceptible to scorching when processed at elevated temperatures, prior to vulcanization, in the presence of certain organic peroxide compounds, are protected against such scorching by the incorporation therein of monomeric vinyl compounds having the structure

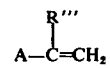

wherein $R'''$ is $C_1$–$C_3$ hydrocarbon and A is phenyl, $C_1$–$C_6$ hydrocarbon substituted phenyl, or

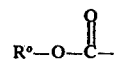

wherein $R°$ is a $C_4$ to $C_{20}$ hydrocarbon radical. The hydrocarbon radicals are devoid of allyl or vinyl unsaturation.

32 Claims, 2 Drawing Figures

TYPICAL MONSANTO RHEOMETER CURVE

COMPOSITION WITH SELECTED VINYL COMPOUNDS AND PROCESS FOR AVOIDING SCORCHING OF ETHYLENE POLYMER COMPOSITION

BACKGROUND OF THE INVENTION

1. Field of the Invention

The invention relates to the prevention of scorching, prior to vulcanization, of peroxide curable ethylene polymer based compositions.

2. Description of the Prior Art

Insulation compositions which are employed on electrical wire and cable are, in many cases, prepared from compositions which are based on vulcanizable, or cross-linkable, ethylene polymers. These ethylene polymer based compositions may be vulcanized, or cured, or crosslinked, with various organic peroxide compounds, as disclosed for example in U.S. Pats. Nos. 2,826,570; 2,888,424; 2,916,481; 3,079,370 and 3,296,189.

In the organic peroxide compounds which have been used to date for commercial purposes in these vulcanizable ethylene polymer based compositions, each oxygen atom in the peroxide group, i.e., —O——O—, of such compounds is directly attached to a carbon atom of an organic radical. The commercially useful compositions do not employ hydroperoxide compounds therein as curing agents because they have relatively high decomposition temperatures, and the free radicals provided by the decomposed hydroperoxides are not effective for cross-linking ethylene polymers.

In order to process the organic peroxide containing compositions so as to adapt them to be placed, as insulation, on the electrical conductor components of the wire and cable it is usually necessary to admix the components of the compositions at high temperatures, and to extrude them, again at high temperatures, onto the electrical conductor. These processing activities occur prior to the intended vulcanization of the peroxide containing compositions, which is usually accomplished after such compositions are extruded onto the electrical conductor.

It has been found, however, that when certain of the organic peroxide compounds, such as dicumyl peroxide, are used in combination with certain types of ethylene polymers or in certain types of ethylene polymer based compositions, that the entire curable composition is susceptible to scorching during the high temperature processing thereof prior to the vulcanization of the composition on the electrical conductor. Scorching is, in effect, the premature vulcanization of the insulation composition. This premature vulcanization usually occurs, when it occurs, in the barrel or die head of the extruder in which the insulation composition is being processed, at elevated temperatures, prior to its being extruded onto an electrical conductor, and prior to its intended vulcanization. When an insulation composition is scorched in the extruder, the extruded composition will have imperfections in the form of discontinuity and roughness in the surface of the extrudate; and lumps or surface ripples caused by gel particles in the body of the extrudate. In addition, excessive scorching may cause enough of a pressure build-up in the extrusion device to require a cessation of the extrusion operation entirely.

The tendency of a composition to experience scorch is a relative matter, since any vulcanizable ethylene polymer based composition can be made to scorch if processed under conditions designed to produce such result. Under a given set of conditions some compositions are more prone to scorching than are others.

Compositions which have been found to be more susceptible to scorching under a given set of conditions are those in which the ethylene polymer has a relatively low melt index and/or a relatively narrow molecular weight distribution.

The tendency of a composition to scorch under commercial operating conditions may be measured by means of the Monsanto Rheometer Test Procedure. The Monsanto Rheometer Test Procedure is described in ASTM-D-2084-71T.

Prior to the work of the present inventor as disclosed in this patent application, and three others filed on even date herewith, scorch prevention has been accomplished by the use of additives such as nitrites as disclosed in U.S. Pat. No. 3,202,648, the specific antioxidants and vulcanization accelerators disclosed in U.S. Pat. No. 3,335,124; and the chain transfer agents disclosed in U.S. Pat. No. 3,578,647. A mixture of two specific peroxides has also been used to provide a rate of cure that is intermediate the rate of cure of either of such peroxides, as disclosed in U.S. Pat. No. 3,661,877.

SUMMARY OF THE INVENTION

It has now been found that vulcanizable ethylene polymer based compositions which employ certain classes of organic peroxides therein as vulcanizing agents, and which compositions are susceptible to scorching under a given set of conditions, can be protected against scorching under such conditions by incorporating in such compositions certain monomeric monofunctional vinyl compounds.

An object of the present invention is to provide scorch resistant, vulcanizable, ethylene polymer based compositions.

Another object of the present invention is to provide a process for protecting against scorching vulcanizable ethylene polymer based compositions which employ therein certain classes of organic peroxides as vulcanizing agents and which are susceptible to scorching.

A further object of the present invention is to provide scorch resistant insulation for electrical wire and cable.

A further object of the present invention is to provide a process whereby vulcanizable ethylene polymer based compositions which employ therein certain classes of organic peroxide compounds as vulcanizing agents and which compositions are susceptible to scorching, may be processed in mixing and extruding devices, prior to the vulcanization thereof, at fast throughput rates and at relatively high processing temperatures without experiencing scorching.

These and other objects of the present invention are achieved by employing certain monomeric vinyl compounds as scorch preventing agents in the compositions of the present inventions.

THE DRAWINGS

FIGS. 1 and 2 of the drawings show, graphically, Monsanto Rheometer Test curves which were used to illustrate the derivation of an efficiency factor as described below.

DESCRIPTION OF THE PREFERRED EMBODIMENT

The Scorch Resistant Composition

Figure 1:
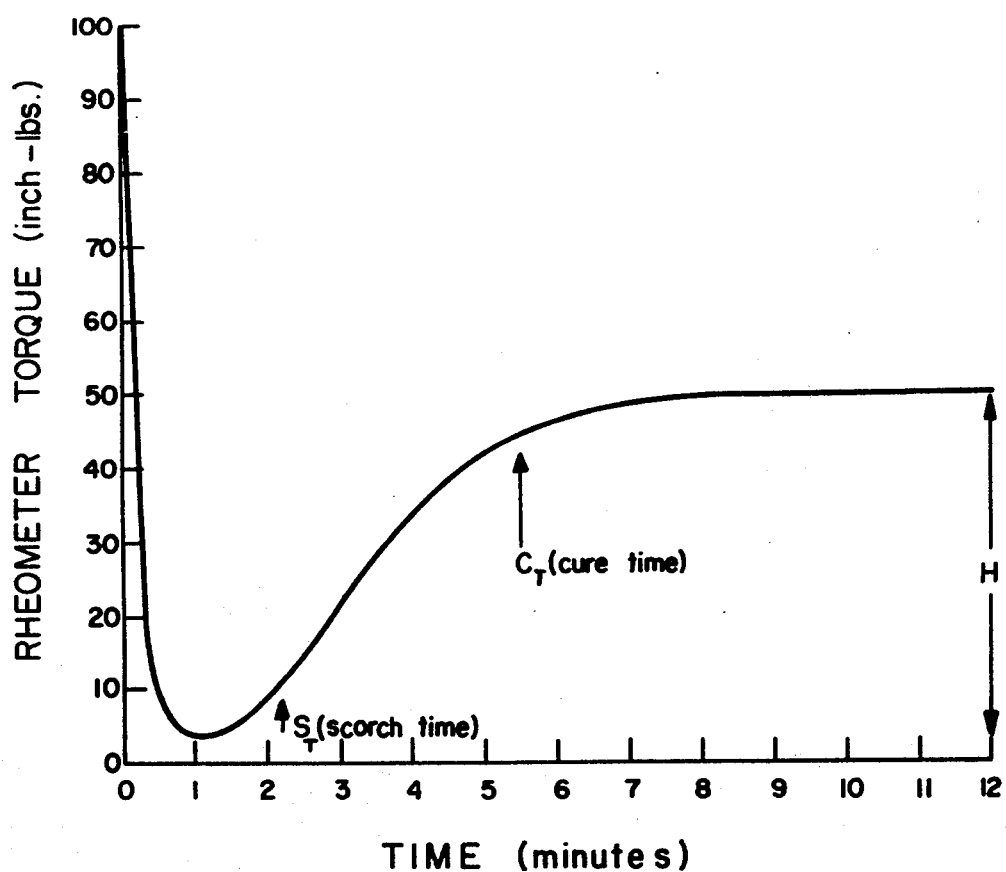

The scorch resistant compositions of the present invention comprise, in weight ratio, 100 parts by weight of ethylene polymer, about 0.1 to 5.0, and preferably 0.2 to 2.0, parts by weight of at least one peroxide compound which has carbon atoms directly bonded to each oxygen atom of each peroxide group (—O—O—) therein, and which compounds, as a class, are described below, and about 0.2 to 5.0, and preferably about 0.5 to 3.0 parts by weight of at least one vinyl compound of the class described below.

ETHYLENE POLYMER

The ethylene polymers which are used in the compositions of the present invention are solid (at 25°C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, >C = C<. These other interpolymerizable compounds may be hydrocarbon compounds such as, butene-1, pentene-1, isoprene, butadiene, bicycloheptene, bicycloheptadiene, and styrene, as well as vinyl compounds such as vinyl acetate and ethyl acrylate.

These copolymers could thus include those containing >0 to 70 weight percent of propylene and 30 to <100 weight percent of ethylene; and >0 to <50 weight percent of butene-1 or vinyl acetate and 50 to <100 weight percent of ethylene; and >0 to <30 weight percent of propylene, >0 to 20 weight percent of butene-1 and 50 to <100 weight percent of ethylene.

The ethylene polymers may be used individually, or in combinations thereof. The ethylene polymers have a density (ASTM 1505 test procedure with conditioning as in ASTM D-1248-72) of about 0.86 to 0.96 and a melt index (ASTM D-1238 at 44 psi test pressure) of about 0.1 to 20 decigrams per minute.

PEROXIDE COMPOUND

The peroxide compound which is employed in the compositions of the present invention is employed therein as the primary vulcanizing agent for the ethylene polymers. These compounds are organic peroxides which have a decomposition half-life of about 0.5 to 4.5 minutes, and preferably of about 1 to 2 minutes, at 160°–200°C., and preferably at 180°–190°C., and which have the structure

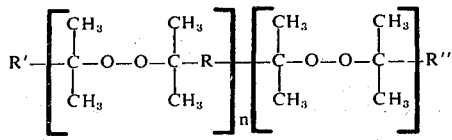

wherein R is a $C_2$ to $C_{12}$ saturated or unsaturated divalent hydrocarbon radical, R' and R'' are the same or different $C_1$ to $C_{12}$ saturated or unsaturated monovalent hydrocarbon radicals, and n is a whole number of 0 or 1.

The R radicals would include aromatic hydrocarbon radicals such as phenylene, and saturated and unsaturated linear $C_2$ to $C_4$ hydrocarbon radicals such as ethynylene (—C≡C—) and ethylene (—CH$_2$—CH$_2$—). The R, R' and R'' radicals may be unsubstituted, preferably, or they may be substituted with inert inorganic radicals such as Cl.

The preferred of the peroxide compounds are those wherein R' = R''.

When n is 0 the peroxide compounds would include (with their decomposition half-life at 180°C.)

di -α- cumyl peroxide. (0.8 to 1.2 minutes), di -α, p - cyml peroxide (0.6 to 1.0 minute) and di-t-butyl peroxide (3.0 to 3.1 minutes).

When n is 1 the peroxide compounds would include (with their decomposition half-life at 180°C.)

α,α'-bis (t-butyl peroxy)di isopropyl benzene (1.0 to 1.3 minutes), 2,5-dimetyl-2,5-di(t-butyl peroxy) hexane (1.2 to 1.4 minutes) and 2,5-dimethyl-2,5-di(t-butyl peroxy) hexyne-3, (4.2 to 4.4 minutes).

The peroxide compounds can be used individually or in combination with one another.

The peroxide compounds which may be used in the compositions of the present invention may also be generally classified as those in which each oxygen atom of each peroxide group is directly bonded to a tertiary carbon atom whose remaining valences are attached to hydrocarbon radicals selected from the group consisting of alkyl, cycloalkyl, alkyl cycloalkyl, aryl and aralkyl. Peroxides of this type are generally disclosed in U.S. Pat. No. 2,888,424. The peroxides are also generally used in cross-linking effective amounts.

MONOMERIC MONOFUNCTIONAL VINYL COMPOUNDS

The monomeric monofunctional vinyl compounds which can be used in the compositions of the present invention have the structure

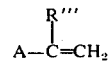

in which R''' is a $C_1$ to $C_3$ hydrocarbon radical, A is an unsubstituted phenyl radical, a phenyl radical substituted with one to five $C_1$ to $C_6$ hydrocarbon radicals, or

in which R° is a $C_4$ to $C_{20}$ hydrocarbon radical. The R''' and R° hydrocarbon radicals, as well as the substituent hydrocarbon radicals for the phenyl radical are devoid of allyl or vinyl unsaturation.

The monofunctional vinyl compounds would include α-methyl styrene, lauryl methacrylate, n-butylmethacrylate, stearyl methacrylate, and p-methyl- α-methyl styrene. About 0.1 to 5, and preferably about 0.5 to 3.0 parts by weight of the monofunctional vinyl compound is used per part by weight of the peroxide compound.

The monofunctional vinyl compounds may be used individually or in combination with each other.

ADJUVANTS

In addition to the ethylene polymer, the peroxide compound and the monomeric vinyl compounds, the compositions of the present invention also advantageously include about 0.01 to 3.0 and, preferably 0.05 to 1.0, parts by weight of one or more suitable high temperature antioxidants for the ethylene polymers, per 100 parts by weight of ethylene polymer in such compositions.

These antioxidants are preferably sterically hindered phenols. Such compounds would include 1,3,5-trimethyl-2,4,6-tris(3,5-ditertiary butyl-4-hydroxy benzyl)benzene; 1,3,5-tris(3,5-ditertiary butyl-4-hydroxy benzyl)-5-triazine-2,4,6-(1H,3H,5H)trione; tetrakis- [methylene-3-(3',5-di-t-butyl-4'-hydroxy phenyl)-propionate] methane; and di(2-methyl-4-hydroxy-5-t-butyl phenyl)sulfide. Polymerized 2,2,4-trimethyl dihydroquinoline may also be used.

Other adjuvants which may be employed in the compositions of the present invention would include adjuvants commonly employed in vulcanizable ethylene polymer based compositions including fillers, such as carbon black, clay, talc and calcium carbonate; blowing agents; nucleating agents for blown systems; lubricants; UV stabilizers; dyes and colorants; voltage stabilizers; metal deactivators and coupling agents.

These adjuvants would be used in amounts designed to provide the intended effect in the resulting composition.

The compositions of the present invention may also be extended, or filled, with polymers other than the ethylene polymer which are compatible, i.e., can be physically blended or alloyed, with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride and polypropylene.

The total amount of adjuvants used will range from 0 to about 60 weight percent based on the total weight of the composition.

PROCESSING OF THE COMPOSITIONS

All of the components of the compositions of the present invention are usually blended or compounded together prior to their introduction into the extrusion device from which they are to be extruded onto an electrical conductor. The ethylene polymer and the other desired constituents may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers, or dissolved in mutual or compatible solvents.

When all the solid components of the composition are available in the form of a powder, or as small particles, the compositions are most conveniently prepared by first making a blend of the components, say in a Banbury mixer or a continuous extruder; and then masticating this blend on a heated mill, for instance a two-roll mill, and the milling continued until an intimate mixture of the components is obtained. Alternatively, a master batch containing the ethylene polymer(s) and the antioxidant(s) and, if desired, some or all of the other components, may be added to the mass of polymer. Where the ethylene polymer is not available in powder form, the compositions may be made by introducing the polymer to the mill, masticating it until it forms a band around one roll, after which a blend of the remaining components is added and the milling continued until an intimate mixture is obtained. The rolls are preferably maintained at a temperature which is within the range 80° to 150°C. and which is below the decomposition temperatures of the peroxide compound(s). The composition, in the form of a sheet, is removed from the mill and then brought into a form, typically dice-like pieces, suitable for subsequent processing.

After the various components of the compositions of the present invention are uniformly admixed and blended together, they are further processed, in accordance with the process of the present invention, in conventional extrusion apparatus at about 120° to 160°C.

After being extruded onto a wire or cable, or other substrate, the compositions of the present invention are vulcanized at elevated temperatures of about ≥ 180°C. and preferably at ≥ 215°–230°C, using conventional vulcanizing procedures.

DERIVATION OF CURING SYSTEM EFFICIENCY FACTOR

In the Monsanto Rheometer Test Procedure a sample of the vulcanizable composition is measured in a rheometer before the composition is subject to high temperature mixing or extrusion conditions. The test results are plotted as functions of inch-pounds of torque versus time. The compositions which are less susceptible to scorching are those that experience, after the minimum torque value is achieved, a delay in the rise of the torque values followed by a fast rise in the torque values to the level required for the intended end use of the composition being evaluated.

The Monsanto Rheometer Test Procedure is, in effect, a means for comparatively evaluating, graphically, the susceptibility of different vulcanizable compositions to scorch. In this way the use of different curing agents, or curing agent compositions, in such vulcanizable compositions, can also be graphically compared.

For the purposes of the present invention, a procedure has now been devised whereby, using the graphical results of Monsanto Rheometer Test procedures, the efficiency of different curable compositions, relative to the susceptibility of such compositions to scorching, can also be numerically compared. By using this new evaluation procedure, a separate and distinct numerical-efficiency factor (E) can be assigned to each curable composition. To make these efficiency factors more meaningful, for comparison purposes, they should be based on rheometer curves which are all obtained when the curable compositions being compared are evaluated under the same test conditions. In all the experiments reported herein the test samples were evaluated in a Monsanto Rheometer at a cure temperature of 360°F., using a rheometer oscillation of 110 CPM and an arc of ±5°.

There is also provided here below, the derivation of a numerical efficiency factor (E) for vulcanizable compositions. The derivation employs typical rheometer curves that were arbitrarily drawn, and which are not based on actual experiments.

A typical Monsanto Rheometer curve, as shown graphically in FIG. 1, contains several parameters which are used in the derivation of the efficiency factor (E). The optimum cure level (highest cross-link density) is designated as H. H is measured in terms of inch-pounds of torque on the rheometer test equipment. A higher value for H corresponds to a higher cross-link density.

The time, in minutes, required to reach 90% of the maximum cure (H) is designated as $C_T$. Thus, in FIG. 1, H is 50 inch-pounds and $C_T$ is 5.5 minutes, which is the time required to reach a level of 45 (or 90% of 50) inch-pounds of torque during the test procedure.

The scorch time, $S_T$, is defined as the point in time, in minutes, at which the curve reaches a rheometer level of 10 inch-pounds of torque on the upswing of the curve. In FIG. 1, $S_T$ is about 2.1 minutes.

In general, one is interested in getting to the maximum cure (H) as soon as possible. At the same time, one would like $S_T$ to be as long as possible since a longer $S_T$ means the vulcanizable composition being evaluated can be processed at a higher speed or at a higher temperature. That is, it would be less scorchy. Thus it is important to discuss the time intervals between $C_T$ and $S_T$, or $C_T - S_T$ since $C_T$ is, arbitrarily, always longer than $S_T$.

Then, too, it is of interest to compare $S_T$ with $C_T - S_T$ since the best vulcanizable system would be one whose $S_T$ is relatively long, and whose difference between $C_T$ and $S_T$, $(C_T - S_T)$, would be relatively short. Thus, the ratio $S_T/C_T - S_T$ is of importance. The larger is this ratio, the less susceptible is the vulcanizable composition to scorching.

Finally, the times ($C_T$ and $S_T$) are related to the maximum cure point, H. Thus, if one can maintain the same $S_T$, and yet reach a higher H, one can thereby provide a vulcanizable composition that is less susceptible to scorch. When vulcanizable compositions are cured by peroxide curing agent systems, particularly those using individual peroxides such as dicumyl peroxide, as you increase the value of H by simply adding more of the peroxide curing agent, you decrease $S_T$.

The efficiency of a particular curing agent system therefore, when used with a given vulcanizable composition, and cured at a given temperature, can be determined by multiplying H by $S_T / C_T - S_T$ or, as shown in Equation I;

$$E = \frac{H \times S_T}{C_T - S_T} \quad (1)$$

The numerical efficiency (E) of the curing agent system shown graphically in FIG. 1 therefore, would, be $$E = \frac{H \times S_T}{C_T - S_T} = \frac{(50)(2.1)}{5.5 - 2.1} = 30.9$$

Figure 2:
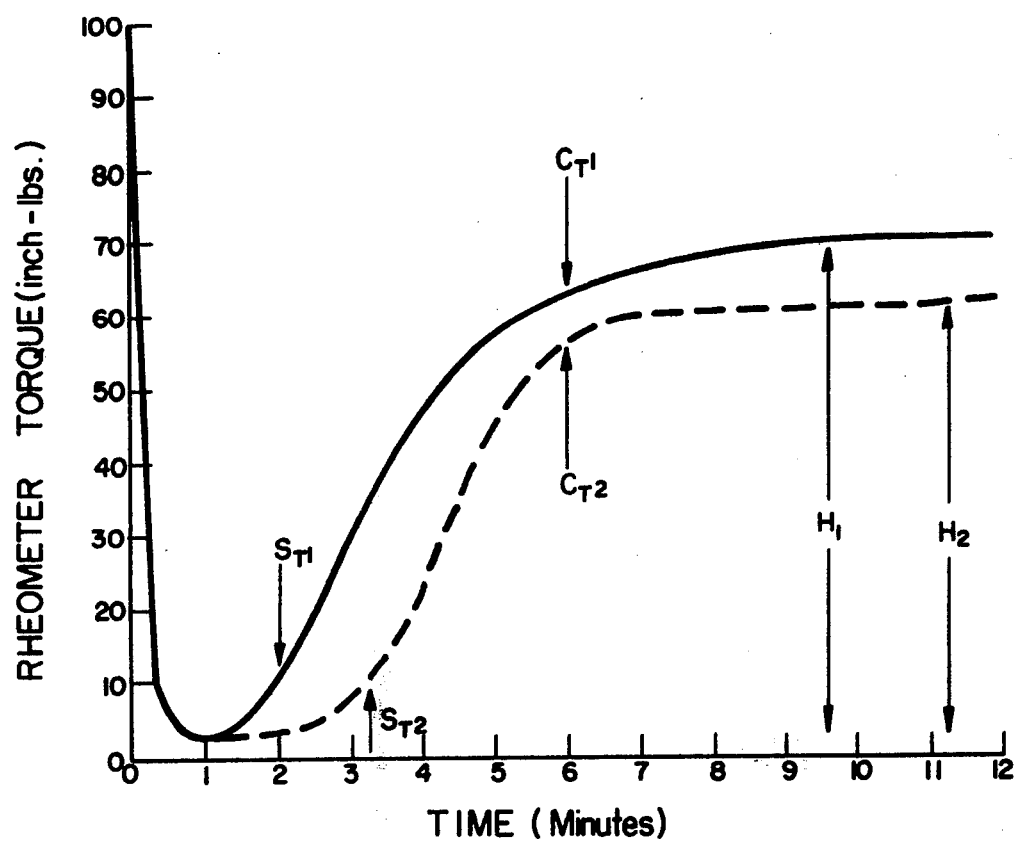

To further illustrate the utility of this method, for the purposes of comparatively evaluating different vulcanizable compositions, reference is made to FIG. 2 of the drawings in which there is graphically presented typical Monsanto Rheometer curves 1 and 2 that were also arbitrarily drawn and which are not based on actual experiments.

It should be noted from a review of FIG. 2 that the cure times $C_{T-1}$ for composition 1 and $C_{T-2}$ for composition 2, are the same for both compositions and each curve reaches a relatively high torque level with the value of $H_1$ (for composition 1) which is 70, being relatively close to the value of $H_2$ (for composition 2) which is 62. $S_{T-2}$ (for composition 2), however, is more than a minute longer than $S_{T-1}$ (for composition 1). 3.2 vs 2.0 minutes. Thus, it is quite obvious from a review of these two curves that curve 2 represents the better cure system. If one maintains the same $C_T$, and reaches almost the same maximum cross-link density (H), then increasing $S_T$ must lead to a better curing system, in accordance with the above definition of E.

A calculation of the relative numerical efficiencies of the curable compositions shown graphically in FIG. 2 is shown below: Efficiency ($E_1$) of composition 1, based on curve 1:

$$E_1 = \frac{H_1 \times S_{T_1}}{C_{T_1} - S_{T_1}} = \frac{(70)(2)}{(6-2)} = \frac{140}{4} = 35.0$$

Efficiency ($E_2$) of composition 2, based on curve 2:

$$E_2 = \frac{H_2 \times S_{T_2}}{C_{T_2} - S_{T_2}} = \frac{(62)(3.2)}{(6-3.2)} = \frac{198.4}{2.8} = 70.8$$

Thus, this efficiency factor, E, is a useful parameter and it can be shown that in fact a higher value for E represents a better system, as defined above, and represents improved utility for such better system. The use of this efficiency factor, E, can also apply to comparisons of Rheometer test curves where the maximum cure (H) shown in each curve is vastly different, since the calculation of E is, in effect, a normalization procedure.

The compositions of the present invention have an efficiency factor (E), as determined above, which is at least about 3, and is preferably more than 10 to 15, units of such efficiency factor above the efficiency factor of such compositions in the absence of the monomeric vinyl compounds.

The following examples are merely illustrative of the present invention and are not intended as a limitation upon the scope thereof.

GENERAL ADMIXING PROCEDURE

The vulcanizable compositions used in Examples 1–28 below were all prepared by the following procedure:

About 100 parts by weight of the ethylene polymer were fluxed in a Banbury mixer at approximately 120°C. The additives, i.e., anti-oxidant, and the peroxide(s) and, where used, other adjuvants, were then added to the fluxed mixture. The resulting composition was then blended for 2–3 minutes and then transferred to a 2-roll mill for sheeting. The hot rolled sheet was then chopped on a hot granulator to yield a chipped product.

The chips were then compression molded into plaques for use in Monsanto Rheometer test procedures. All of the rheometer data which was then obtained on the samples, unless otherwise stipulated, was obtained at 360°F. (182.2°C.).

EXAMPLES 1-12

A series of 12 vulcanizable compositions were prepared and evaluated for Efficiency Factors, as disdisclosed above. The compositions were prepared as disclosed in the General Admixing Procedure above. Each composition contained

- 97.84 parts by weight of an ethylene homopolymer having a density of 0.92 and a melt index of 1.6–2.2 (1P, 190°C.)
- 1.96 parts by weight of dicumyl peroxide, and 0.20 parts by weight of di(2-methyl-4-hydroxy-5-2-butyl phenyl) sulfide.

The compositions of Examples 1-2 were control experiments designed to show the reproducibility of the E values for the test samples. The compositions of Examples 1-2 contained no monomeric unsaturated compound.

The compositions of Examples 3-12 were used to evaluate various unsaturated monomeric compounds as candidate scorch retarders. Table I presented below lists the candidate monomer, the parts by weight thereof that was employed, and the resulting H, $C_T$, $S_T$ and E values.

The candidate cure retarders of Examples 3-12 were added in equimolar concentrations.

EXAMPLES 13-18

A series of six vulcanizable compositions were prepared and evaluated for Efficiency Factors, as disclosed above. The compositions were prepared as disclosed in the General Admixing Procedure above. Each composition contained

- 100 parts by weight of an ethylene vinyl acetate copolymer which contained 10% by weight of vinyl acetate and which had a density of 0.92 and a melt index of 2.0 (1P, 190°C),
- 35 parts by weight of carbon black,
- 1.6 parts by weight of dicumyl peroxide, and
- 0.5 parts by weight of polymerized 2,2,4-trimethyl dihydroquinoline.

The composition of Example 13 was a control which contained no monofunctional vinyl compound. The compositions of Examples 14-18 were used to evaluate various unsaturated monomeric compounds as candidate scorch retarders in the composition of Example 13. Table II presented below lists the candidate monomer, the parts by weight thereof that was employed,

TABLE I

| Example | Candidate Cure Retarder | Parts by wt. of Candidate Cure Retarder | H, in-lbs | $C_T$, minutes | $S_T$, minutes | E |
|---|---|---|---|---|---|---|
| 1 | None | — | 40.5 | 5.8 | 1.88 | 19.4 |
| 2 | None | — | 42.0 | 5.7 | 1.95 | 21.8 |
| 3 | n-octyl acrylate | 1.11 | 43.0 | 4.9 | 1.53 | 19.8 |
| 4 | vinyl neo-decanoate | 1.19 | 40.0 | 4.8 | 1.63 | 20.6 |
| 5 | 1-dodecene | 1.01 | 36.0 | 5.0 | 1.8 | 20.3 |
| 6 | allyl caprylate | 1.11 | 34.0 | 5.2 | 2.0 | 21.2 |
| 7 | 2-methyl-1-undecene | 1.01 | 32.5 | 5.5 | 2.1 | 20.1 |
| 8 | allyl phenyl ether | 0.81 | 28.0 | 5.6 | 2.2 | 18.1 |
| 9 | vinyl hexadecyl ether | 1.62 | 28.0 | 5.0 | 2.0 | 18.7 |
| 10 | lauryl methacrylate | 1.53 | 41.5 | 5.9 | 2.4 | 28.5 |
| 11 | α-methyl styrene | 0.71 | 41.0 | 5.4 | 2.2 | 28.2 |
| 12 | n-butyl methacrylate | 0.86 | 40.5 | 5.9 | 2.4 | 28.0 |

A review of the results of these experiments indicates and the resulting H, $C_T$, $S_T$ and E values.

TABLE II

| Example | Candidate Cure Retarder | Parts by wt. of Candidate Cure Retarder | H, in-lbs | $C_T$, minutes | $S_T$, minutes | E |
|---|---|---|---|---|---|---|
| 13 | None | — | 78.0 | 4.9 | 1.15 | 23.9 |
| 14 | n-octyl acrylate | 1.11 | 72.5 | 4.6 | 1.2 | 25.6 |
| 15 | vinyl neo-decanoate | 1.19 | 70.0 | 4.6 | 1.1 | 22.0 |
| 16 | 2-methyl-1-undecene | 1.01 | 59.0 | 5.0 | 1.1 | 16.6 |
| 17 | vinyl hexadecyl ether | 1.62 | 58.0 | 4.5 | 1.2 | 21.1 |
| 18 | lauryl methacrylate | 1.53 | 67.0 | 5.4 | 2.25 | 47.9 | that it is only the unsaturated additives of Examples 10 to 12, which are representative of the scorch retarders of the present invention, that provide substantial improvements in the E values.

The addition of the other unsaturated compounds, in Examples 3-9, produced little or no increase, if not a decrease, in the value of E.

A review of the results of Examples 13-18 indicates that it is only the unsaturated additive of Example 18, which is representative of the scorch retarders of the present invention, that provides a substantial improvement in the E value of the composition of Example 13.

EXAMPLES 19–23

A series of five vulcanizable compositions were prepared and evaluated for Efficiency Factors, as disclosed above. The compositions were prepared as disclosed in the General Admixing Procedure above. Each composition contained 100 parts by weight of an ethylene-propylene-diene terpolymer (Nordell 1500 resin sold by duPont) that contained about 16 mole percent (22.4 weight %) of propylene, and 83 mole percent (77.5 weight %) of ethylene and a small amount (about 1 mole %) of an unidentified (diene) monomer, and 1.5 parts by weight of dicumyl peroxide.

The composition of Example 19 was a control which contained no monofunctional vinyl compound. The compositions of Examples 20–23 were used to evaluate various unsaturated monomeric compounds as candidate scorch retarders in the composition of Example 19. Table III presented below lists the candidate monomer, the parts by weight thereof that was employed, and the resulting H, $C_T$, $S_T$, and E values.

TABLE III

| Example | Candidate Cure Retarder | Parts by wt. of Candidate Cure Retarder | H, in-lbs | $C_T$, min-utes | $S_T$, min-utes | E |
|---|---|---|---|---|---|---|
| 19 | None | — | 114.0 | 3.88 | 0.61 | 21.3 |
| 20 | vinyl neo-decanoate | 1.19 | 105.0 | 4.2 | 0.67 | 19.9 |
| 21 | n-octyl acrylate | 1.11 | 108.0 | 3.8 | 0.48 | 15.6 |
| 22 | allyl phenyl ether | 0.81 | 84.0 | 3.9 | 0.75 | 20.0 |
| 23 | lauryl methacrylate | 1.53 | 106.0 | 4.3 | 0.93 | 29.3 |

A review of the results of Examples 19–23 indicates that it is only the unsaturated additive of Example 23, which is representative of the scorch retarders of the present invention, that provides a substantial improvement in the E value of the composition of Example 19.

EXAMPLES 24–28

A series of five vulcanizable compositions were prepared and evaluated for Efficiency Factors, as disclosed above. The compositions were prepared as disclosed in the General Admixing Procedure above. Each composition contained about 73.8 parts by weight of an ethylene-vinyl acetate copolymer which contained 10% vinyl acetate and which had a density of 0.92 and a melt index of 2.0 (IP, 190°C), 25.8 parts by weight of carbon black, 0.4 parts by weight of trimethyl dihydroquinoline, and 1.0 part by weight of α,α' bis(t-butyl peroxy di-isopropyl)benzene.

The composition of Example 24 was a control which contained no monofunctional vinyl compound. The compositions of Examples 25–28 were used to evaluate various unsaturated monomeric compounds as candidate cure retarders in the composition of Example 24. Table IV presented below lists the candidate monomer, the parts by weight thereof that was employed, and the resulting H, $C_T$, $S_T$, and E values.

TABLE IV

| Example | Candidate Cure Retarder | Parts by wt. of Candidate Cure Retarder | H, in-lbs | $C_T$, min-utes | $S_T$, min-utes | E |
|---|---|---|---|---|---|---|
| 24 | None | — | 76.0 | 6.6 | 1.3 | 18.6 |
| 25 | n-octyl acrylate | 1.11 | 44.0 | 6.5 | 1.7 | 15.6 |
| 26 | 1-dodecene | 1.01 | 67.0 | 6.7 | 1.45 | 18.5 |
| 27 | vinyl neo-decanoate | 1.19 | 78.0 | 6.4 | 1.25 | 18.9 |
| 28 | lauryl methacrylate | 1.53 | 66.0 | 7.8 | 2.94 | 39.9 |

A review of the results of Examples 24–28 indicates that it is only the unsaturated additive of Example 28, which is representative of the scorch retarders of the present invention, that provides a substantial improvement in the E value of the composition of Example 24.

The candidate cure retarders were used in all the examples in equimolar amounts.

What is claimed is:

1. A scorch resistant vulcanizable composition comprising, in weight ratio, 100 parts by weight of ethylene polymer, about 0.1 to 5.0 parts by weight of at least one peroxide compound which has a decomposition half-life of about 0.5 to 4.5 minutes at 160° to 200°C. and has the structure

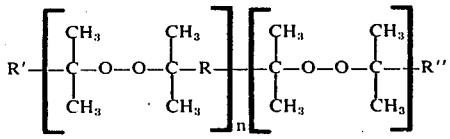

wherein R is a $C_2$ to $C_{12}$ divalent hydrocarbon radical, R' and R'' are the same or different $C_1$ to $C_{12}$ monovalent hydrocarbon radicals, and n is a whole number of 0 or 1, and about 0.2 to 5 parts by weight of at least one vinyl compound which has the structure

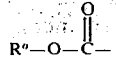

wherein R''' is a $C_1$ to $C_3$ hydrocarbon radical,
A is an unsubstituted phenyl radical, a phenyl radical substituted with 1 to 5 $C_1$ to $C_6$ hydrocarbon radicals, or

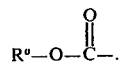

wherein $R^o$ is a $C_4$ to $C_{20}$ hydrocarbon radical,
with the proviso that the R''' and $R^o$ radicals and the phenyl substituents are devoid of allyl or vinyl unsaturation.

2. A composition as in claim 1 in which $n = 0$.
3. A composition as in claim 2 in which $R' = R''$.
4. A composition as in claim 3 in which $R'$ and $R''$ are phenyl radicals.
5. A composition as in claim 3 in which $R'$ and $R''$ are methyl radicals.
6. A composition as in claim 1 in which $n = 1$.
7. A composition as in claim 6 in which $R' = R''$.
8. A composition as in claim 7 in which R is an aromatic radical.
9. A composition as in claim 8 in which R is phenylene.
10. A composition as in claim 9 in which $R'$ and $R''$ are methyl radicals.
11. A composition as in claim 7 in which R is a $C_2$ to $C_4$ linear hydrocarbon radical.
12. A composition as in claim 11 in which $R'$ and $R''$ are methyl radicals.
13. A composition as in claim 1 in which A comprises a phenyl radical.
14. A composition as in claim 13 in which said vinyl compound is α-methyl styrene.
15. A composition as in claim 1 in which A is

16. A composition as in claim 15 in which said vinyl compound is lauryl methacrylate.
17. A process for preventing the scorching of a vulcanizable composition which is susceptible to scorching during the processing thereof at temperatures of about 120° to 160°C. prior to the intended vulcanization thereof, said composition comprising, in weight ratio,
100 parts by weight of ethylene polymer, and
about 0.1 to 5.0 parts by weight of at least one peroxide compound which has a decomposition half-life of about 0.5 to 4.5 minutes at 160 to 200°C. and has the structure

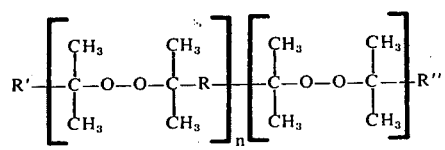

wherein R is a $C_2$ to $C_{12}$ divalent hydrocarbon radical,
$R'$ and $R''$ are the same or different $C_1$ to $C_{12}$ monovalent hydrocarbon radicals, and $n$ is a whole number of 0 or 1,
which comprises admixing into said composition, prior to said processing, about 0.2 to 5 parts by weight of at least one vinyl compound which has the structure

wherein R''' is a $C_1$ to $C_3$ hydrocarbon radical,
A is an unsubstituted phenyl radical, a phenyl radical substituted with 1 to 5 $C_1$–$C_6$ hydrocarbon radicals, or

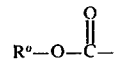

wherein $R^o$ is a $C_4$ to $C_{20}$ hydrocarbon radical,
with the proviso that the R''' and $R^o$ radicals and the phenyl substituents are devoid of allyl or vinyl unsaturation,
and then processing and vulcanizing said composition.

18. A process as in claim 17 in which A comprises a phenyl radical.
19. A process as in claim 18 in which said vinyl compound is α-methyl styrene.
20. A process as in claim 17 in which A is

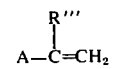

21. A process as in claim 20 in which said vinyl compound is lauryl methacrylate.
22. A vulcanized composition prepared by the process of claim 17.
23. Electric wire or cable insulated with a vulcanized composition prepared by the process of claim 17.
24. The composition of claim 1 in vulcanized form.
25. Electric wire or cable insulated with the composition of claim 1 in vulcanized form.
26. A scorch resistant vulcanizable composition comprising
ethylene polymer,
crosslinking effective amounts for said ethylene polymer of at least one peroxide compound in which each oxygen atom of each peroxide group is directly bonded to a tertiary carbon atom whose remaining valences are attached to hydrocarbon radicals selected from the group consisting of alkyl, cycloalkyl, alkyl cycloalkyl, aryl and aralkyl, and 0.2 to 5 parts by weight, per 100 parts by weight of said ethylene polymer, of at least one vinyl compound which has the structure

wherein R''' is a $C_1$ to $C_3$ hydrocarbon radical,
A is an unsubstituted phenyl radical, a phenyl radical substituted with 1 to 5 $C_1$ to $C_6$ hydrocarbon radicals, or

wherein R″ is a C₄ to C₂₀ hydrocarbon radical,
with the proviso that the R‴ and R″ radicals, and the phenyl substituents are devoid of allyl or vinyl unsaturation.

27. A composition as in claim 26 in which said peroxide compound comprises dicumyl peroxide.

28. A composition as in claim 27 in which said vinyl compound comprises lauryl methacrylate.

29. A composition as in claim 27 in which said vinyl compound comprises α-methyl styrene.

30. A composition as in claim 27 in which said vinyl compound comprises n-butyl methacrylate.

31. A composition as in claim 26 in which said peroxide compound comprises α,α′-bis (tertiary butyl peroxy diisopropyl) benzene.

32. A composition as in claim 31 in which said vinyl compound comprises lauryl methacrylate.

* * * * *

UNITED STATES PATENT OFFICE
CERTIFICATE OF CORRECTION

Patent No. 3,954,907    Dated May 4, 1976

Inventor(s) Donald L. Schober

It is certified that error appears in the above-identified patent and that said Letters Patent are hereby corrected as shown below:

Column 4, line 25, "dimetyl" should read --dimethyl--.

Column 11, the headings in Table III should read, in part,

-- $C_T$,    $S_T$,  --
   min-    min-
   utes    utes

Signed and Sealed this

Twelfth Day of October 1976

[SEAL]

*Attest:*

RUTH C. MASON
*Attesting Officer*

C. MARSHALL DANN
*Commissioner of Patents and Trademarks*